J. A. Bawsel,

Making Plug Tobacco.

No. 2,240. Reissued May 8, 1866.

Witnesses:
John Blackie
D. T. Drage

Inventor:
Alexander Marshall
Assignee of J. A. Bawsel
By W. G. Dorlys
Attorney.

N. PETERS, PHOTO-LITHOGRAPHER, WASHINGTON, D. C.

UNITED STATES PATENT OFFICE.

ALEXANDER HARTHILL, OF NEW YORK, N. Y., ASSIGNEE OF J. A. BAWSEL, OF POWHATAN COURT-HOUSE, VIRGINIA.

IMPROVEMENT IN TOBACCO-PRESSES.

Specification forming part of Letters Patent No. 24,187, dated May 31, 1859; Reissue No. 2,240, dated May 8, 1866.

*To all whom it may concern:*

Be it known that JOHN A. BAWSEL, of Powhatan Court-House, in the county of Powhatan and State of Virginia, has invented certain new and useful Improvements in Machines for Pressing Tobacco; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

This invention consists, principally, of a roller having a groove or recess in it working in connection with another roller having a flange or projection on it to fit the groove in the first for pressing tobacco by passing it between them, and in various devices operating in connection therewith.

Figure 2:
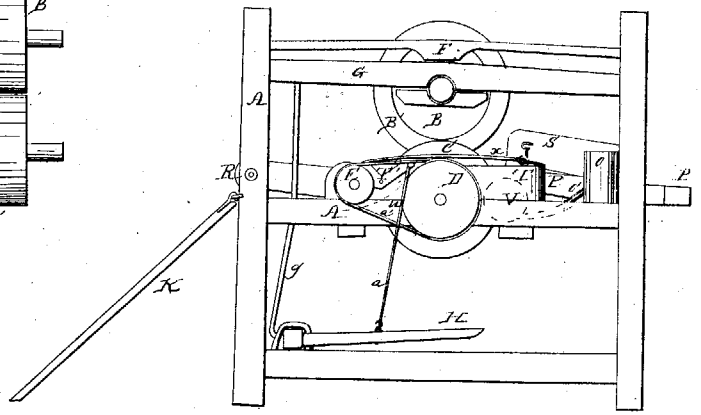
Figure 3:
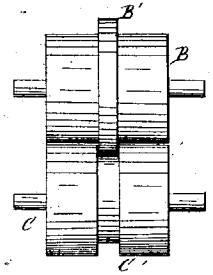
Figure 1:
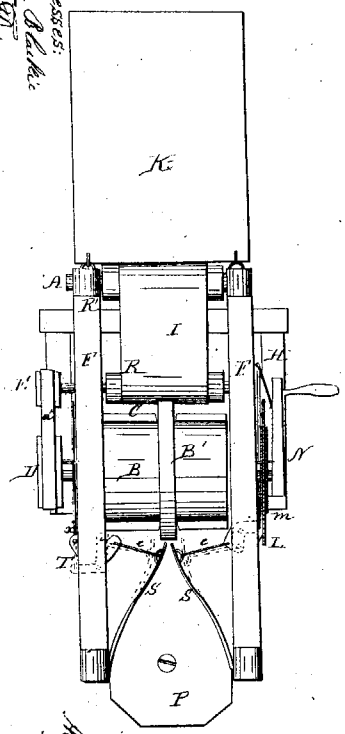

Figure 1 is a side elevation; Fig. 2, a top plan view, and Fig. 3 a view of the rollers detached.

A represents a frame of any required form and size. Upon the horizontal side bars, A′, of this frame is mounted transversely a roller, C, having a circumferential groove or recess, C′, formed around it, as shown clearly in Fig. 3.

B represents a corresponding roller, having a projecting rim or flange, B′, extending around it, and of proper size to fit into the groove or recess in the roller C, as shown. This roller B has its bearings in the bars G of the frame, as shown in Fig. 1, and is so located as to be directly over the roller C, the two rollers being connected by the gear-wheels L and M, whereby they are compelled to move together. The lower wheel, C, is provided on its opposite end with a pulley, D, from which a band extends to another pulley, E, on the shaft of a roller, R, around which and another similar roller, R′, an endless belt or apron, I, extends.

P represents a platform or table arranged so as to be level with the upper face of the wheel C, or nearly so, as shown in Figs. 1 and 2, and upon this table are secured two flat springs, S, standing on edge, and being secured at their outer end to the frame, as shown in Fig. 2. These springs are curved so that their inner ends very nearly meet directly opposite the groove in the roller C, thereby forming a channel to guide the tobacco which is placed on the table P into the groove C′ of roller C, where it is pressed by the flange B′ as the rollers revolve.

In order to regulate the quantity of tobacco fed to the rollers, these springs are connected by rods *e* to elbow-levers T, as shown in Fig. 2, these latter being connected by a rod, *x*, to similar elbow-levers, T′, as shown in Fig. 1, these latter being connected by a rod, *a*, to a treadle, H, as shown in Fig. 1. By pressing on the treadle H the springs S are pulled asunder, as indicated in red in Fig. 2, thereby increasing the space between them.

In order to permit the rollers to accommodate themselves somewhat to the quantity or thickness of tobacco passing between them, one of them—in this case the upper one, B—is mounted in movable bearings, the bars G fitting loosely into mortises at their ends in the posts of the frame, so as to allow them to play up and down to a limited extent, a spring-bar, F, being arranged to bear upon the bar G, as shown in Fig. 1, and thus press the roller B down, and at the same time permit it to yield slightly to prevent injury in case any hard substance or unusual thickness of material should accidentally get between the rollers. An inclined board, K, is attached to the end of the frame, as shown in Fig. 1, to receive the tobacco after it has been pressed and carried forward and delivered by the endless belt or apron I.

In order to prevent the tobacco from adhering to the rollers, a scraper, U, is located in front of the rollers in such a position as to fit into the groove in the roller C and scrape off any adhering particles, this scraper being shown in dotted lines in Fig. 1.

In order to render the operation still more perfect, a wheel, V, also shown in dotted lines, is located on the opposite side of wheel C, and fitted into the groove therein. This wheel V is kept lubricated on its surface with oil from the reservoir or cup O by means of the pipe O′, the surface of the wheel V being preferably covered with cloth or some similar material, to absorb and distribute evenly the oil in the groove C′.

The machine thus constructed is adapted for pressing tobacco in two different stages of its manufacture:

First. When it is desired to straighten the leaves or parts of leaves and compress them preparatory for packing. To do this a bunch of the leaves is placed on the table, butts foremost, and shoved forward until it is caught and drawn forward by the rollers, the springs S pressing more or less upon the leaves, and thereby tending to hold them, and thus straightening them out, the rollers flattening or compressing them as they pass through the groove C′. By pressing on the treadle H the pressure of the springs upon the mass of tobacco can be regulated so as to prevent tearing or otherwise injuring it.

Second. For pressing the tobacco, after it has been suitably prepared, into plug-tobacco. To do this the tobacco, suitably sweetened or soaked, is placed on the table P and shoved forward until it is caught at the front end between the rollers B and C, when it will be carried through in a continuous strip, the width of which will, of course, be exactly equal to the width of the groove C′, the thickness of the plug or strip being regulated by the space between the periphery or surface of the flange B′ and the bottom of the groove C′, and this space may be regulated at will by means of wedges to secure the bars G in a higher or lower position, and thus bring the rollers B and C nearer together or farther apart, according as it is desired to form a thick or thin plug. It will thus be seen that by simply keeping the machine supplied with the material the tobacco will be at a single operation pressed into a continuous long plug or strips which will be delivered at the front end of the machine, where it will be cut into piece, of suitable length and removed as fast as formed, or from whence it may be at once passed into another machine and by it be cut into plugs of the size required.

The springs F are mainly intended for use during the first operation, as when pressing plug-tobacco more pressure is required, and hence in such cases the bars G are either keyed rigidly by means of the wedges or allowed but a limited movement.

It is obvious that the machine may be operated by hand or driven by power, as described.

It is obvious that the roller B may be constructed in the simple form of a wheel or pulley of proper thickness to fit the groove $c'$, instead of in the style shown in the drawings, its office being simply to press the tobacco into the groove $c'$ and compress it therein. It is also obvious that instead of the roller C with its groove C′, a pulley or wheel having radial flanges projecting on each side may be used, the object being to provide a channel or groove for the tobacco to be pressed in.

If desired, the machines may be made of two styles—one light, to be used for straightening and pressing the leaves for packing, and the other heavier and stronger for pressing the tobacco into plugs.

By this invention I am enabled to substitute machine for hand labor, and thereby dispense with the slow and tedious process heretofore practiced of forming each plug separately by hand and then pressing it, whereby a great saving of time and labor is effected.

Having thus described this invention, what I claim is—

1. The process of pressing tobacco by passing it through the channel or groove C, with the follower B′ working therein, substantially as shown and described.

2. The combination of the rollers B and C, with the endless belt or apron I, arranged to operate as set forth.

3. The combination of the springs S, the elbow-levers T and T′, rods $a$ and $x$, with the treadles H, arranged to operate as herein described.

4. The roller V, located in a suitable position to lubricate the channel C′, or the follower B, and supplied with oil from any suitable reservoir, substantially as set forth.

5. The scraper U, when arranged to operate in connection with the channel C′, for the purpose of keeping the latter free from adhering substances, as set forth.

ALEX. HARTHILL,
*Assignee of John A. Bawsel.*

Witnesses:
WM. D. JONES,
WM. ADDY.